Figure 1:
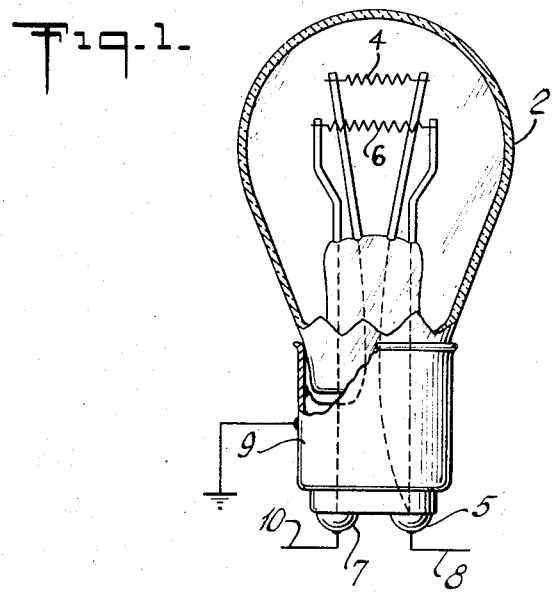

Oct. 24, 1967   H. G. SIIBERG   3,349,280
SIGNAL LAMP FOR DUAL INTENSITY CIRCUITS AND THE LIKE
Filed Jan. 14, 1965   2 Sheets-Sheet 1

INVENTOR
HEMMING G. SIIBERG
BY
Eyre, Mann & Lucas
ATTORNEYS

United States Patent Office 3,349,280
Patented Oct. 24, 1967

3,349,280
SIGNAL LAMP FOR DUAL INTENSITY CIRCUITS
AND THE LIKE
Hemming G. Siiberg, Union, N.J., assignor to Wagner
Electric Corporation, a corporation of Delaware
Filed Jan. 14, 1965, Ser. No. 425,595
1 Claim. (Cl. 315—77)

The present invention relates to a novel tail and signal lamp and to circuits incorporating the same.

In modern automobile signalling and lighting circuits, there are various requirements specified by the automobile manufacturer that must be met by a supplier and there are also various features in a supplied circuit or lamp that is preferred by the automobile manufacturer. For example, it is desired that there be a difference in lamp brilliance as between day and night, brighter lights being desired for signalling and braking during the day than during the night. A requirement in the new systems is that during the night the parking light extinguishes during directional signalling. It also is required that during directional signalling, if the brake is applied, only the tail light on the side to which the car is to turn shall flash and the other brake light be steady-on. The directional signalling system on an automobile is separate from the circuit of the head lamps but is integral with the parking and braking circuits. Ordinarily, the signal lamp and parking lamp at the front of the car are separate filaments in the same bulb and the rear parking, signal lamp and brake lamp are all in one envelope.

The new combined tail light, signal lamp and emergency brake lamp is of such construction that with an appropriate associated circuit, it can provide three levels of light intensity by the use of but two filaments. The lamp comprises two filaments preferably of different candle power. The filaments are connected together at one end. The other end of one of the filaments is grounded and the other end of the other filament is adapted to be either grounded or connected either directly or through the flasher to the battery. During day-time operation, the second filament is grounded so that, when the battery is connected to the junction of the filaments, either through the brake switch or through the signal flasher, both filaments are energized in parallel and maximum intensity is obtained. During night operation, when it is desired that the parking light be energized, the filaments are connected in series reducing the candle power of the lamp to a low value. When the brake switch is closed at night, one of the filaments is cut out from energization with the result that the intensity of the lamp is intermediate that of daytime braking and that of parking. During signalling at night, only one filament is flashed and the brake switch is connected only to the lamp on the other side of the car. In the preferred circuit employing the new lamp, not only are provisions made for dual intensity as above indicated, but also for emergency flashing of all signal lamps.

The new lamp can also be incorporated in present single intensity automobile signalling and lighting circuits to convert such circuits to dual intensity without change in the existing circuitry except the addition thereto of a simple thermal or magnetic relay.

Figure 3:
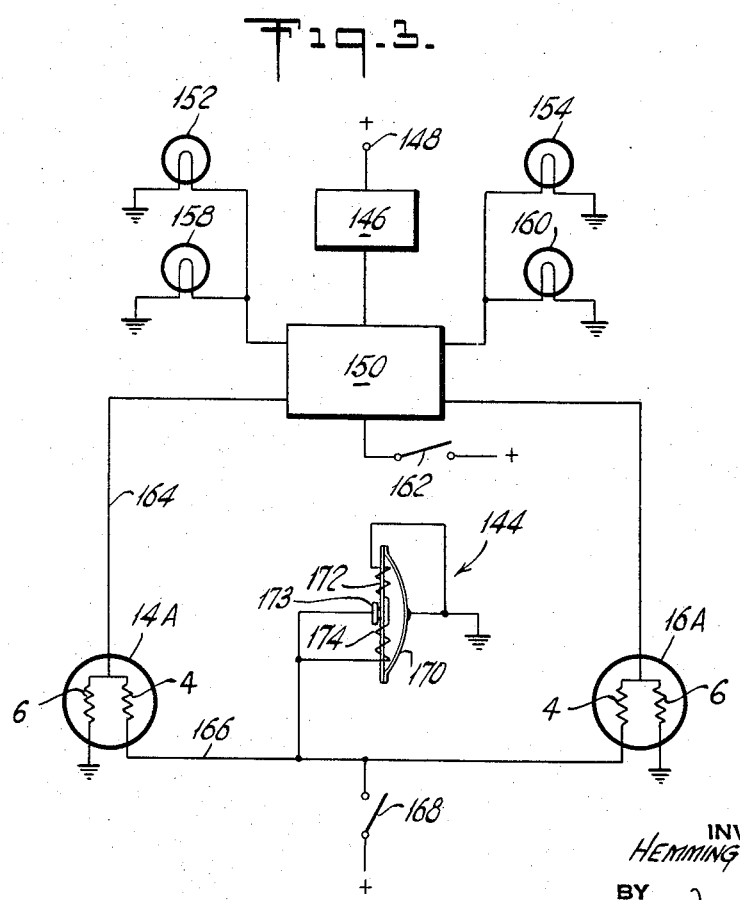
Figure 2:
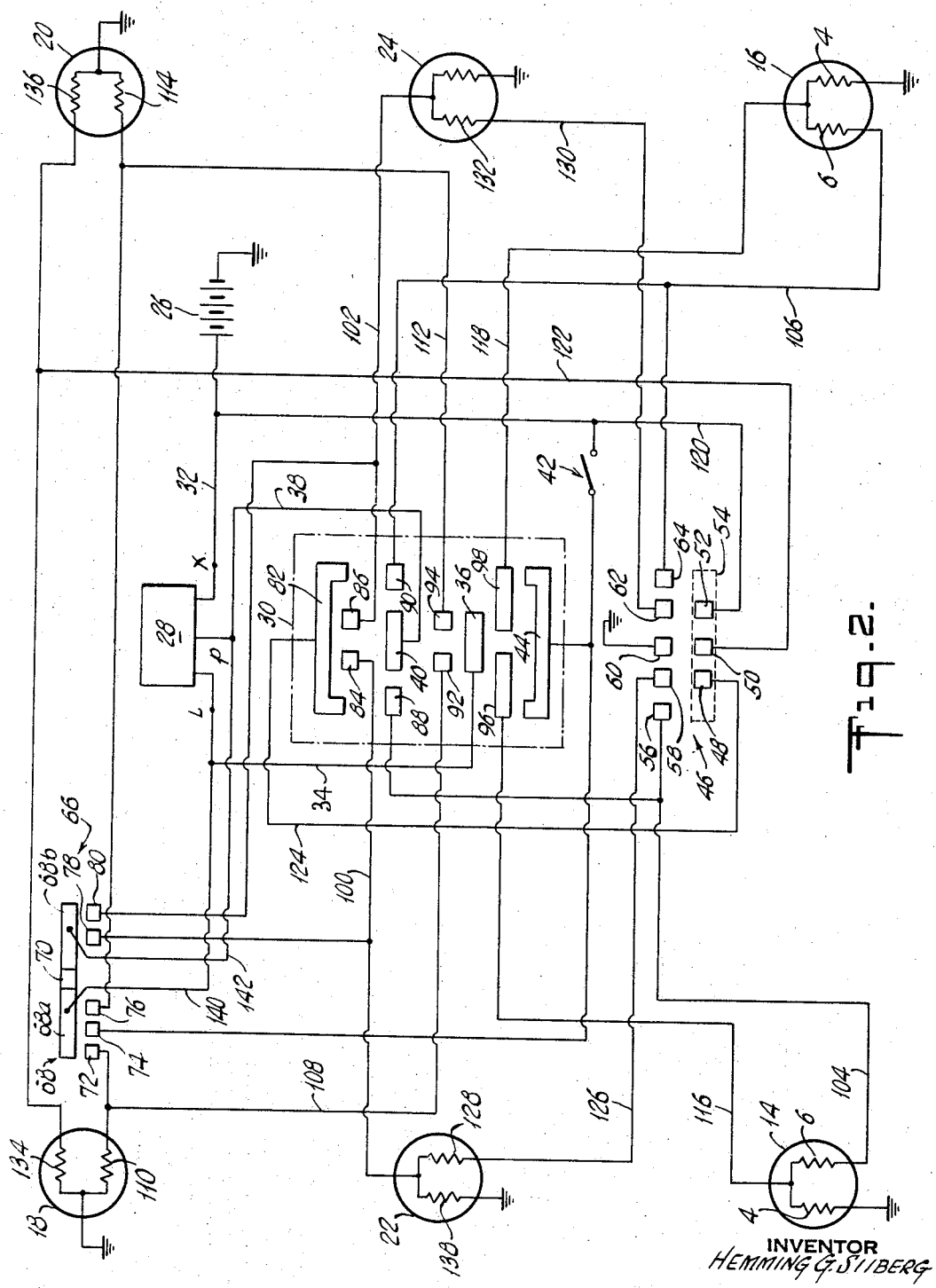

For a better understanding of the invention, of the new lamp thereof, and of a circuit incorporating the same, reference may be had to the accompanying drawing of which FIG. 1 is a representation of a specific combined tail and signal lamp embodying the invention;

FIG. 2 is a diagram of a novel dual intensity and emergency signalling circuit incorporating the lamp of FIG. 1; and FIG. 3 is a circuit diagram illustrating the conversion of a single intensity circuit to a dual intensity circuit by the use of the lamp of the type of FIG. 1 and the addition of a relay.

The new lamp is shown in FIG. 1 as comprising a bulb 2, a minor filament 4 and a major filament 6. The lamp illustrated in FIG. 1 is of the general construction of the 1034 or 1157 miniature automobile lamp, the difference being the specific filaments and their connections. The bulb is an S-8 bulb and the base style is D.C. Index. In such type lamp, there are two solder connections 5 and 7 on the base, each of which is ordinarily connected to one end of a filament and the other ends of the filaments are connected to ground at the shell 9. In the lamp of FIG. 1, one end of each filament 4 and 6 is connected to one solder connection 5, on the base, the other end of filament 4 is connected to ground at the shell 9 and the other end of filament 6 is connected to the other solder connection 7. This change in filament construction is the only departure from a 1034 or 1157 lamp aside, of course, from the difference in the specific filaments employed. Filament 4 is of relatively low candle power as compared to filament 6. For example, filament 4 may be of 14 candle power and filament 6 of 30 candle power in which case, if the supply voltage is 12.8 volts, the normal current through filament 4 will be 1.3 amperes and that through filament 6 will be 2.1 amperes when at full brilliance. The filaments are connected through solder connection 5 to a lead-in wire 8. The shell 9 is grounded whereas the solder connection 7 connects with a lead 10. Three levels of intensity of the lamp of FIG. 1 are possible, depending upon the circuit connection to leads 8 and 10. When the circuit of lead 8 is open and lead 10 is connected to the battery, the current flows through filaments 6 and 4 in series and because of the inclusion of these two filaments in the circuit, the candle power is reduced to 7 candle power. When the battery is connected to both leads 8 and 10, then filament 6 is out of circuit because the same potential is applied to both ends thereof and the current flows only through filament 4 giving an intensity of 14 candle power. If lead 10 is connected to ground and the battery connected to lead 8, both filaments are in parallel in the circuit and the full intensity of 44 candle power is obtained. These numerical values are particularly suitable for automotive use but obviously other specific filaments could be employed having different candle power.

The circuit of FIG. 2 is particularly adapted for use with lamps such as that above described in connection with FIG. 1 and provides the circuitry for utilizing the three levels of intensity obtainable with the described lamp. In the circuit of FIG. 2, means are provided for operation during the day, at which time filament 6 is grounded, and the full 44 candle power is obtained during braking or during signalling. Means are also provided for connecting the lead from filament 6 to the battery for parking during the night and therefore giving 7 candle power intensity to the tail light. The circuit also provides that, during directional signalling at night, only filament 4 will be energized to yield 14 candle power during directional signalling and the same is true when the brake is applied. For emergency flashing of all signals, the circuit insures that the tail lamps will flash at 14 candle power intensity during the night and at 44 candle power intensity during the day.

The circuit of FIG. 2 is similar in some respects to the circuit described and claimed in applicant's co-pending application Ser. No. 407,628, filed Oct. 30, 1964 but is an improvement over that circuit in certain respects. In that circuit, for example, it was necessary, for emergency signalling, to first move the directional signal into the right turn position before throwing the emergency switch. Also in that circuit, separate tail lamps had to be provided for night-time operation. The circuit of FIG. 3 differs from dual intensity circuits heretofore in use or proposed for use in that the lower intensity of the tail lamp at night does not require the use of additional series resistors. Such resistors add to the cost of the equipment and waste useful energy.

In FIG. 2 two combined tail and signal lamps, each of the construction of FIG. 1 are shown at 14 and 16 respectively, lamp 14 being the left rear lamp and lamp 16 being the right rear lamp. Lamps 18 and 20 comprise the left front parking and signal lamp and right front parking and signal lamp, respectively. Lamps 22 and 24 represent left and right pilot lamps, respectively. Pilot lamps 22 and 24 are each like the lamp of FIG. 1 in that the filaments of each are of different candle power and only one filament of each is normally grounded. The car carried battery is shown at 26, a flasher of the variable load type is shown at 28, and a Bell type directional signal switch is shown at 30. The details of the flasher 28 are not shown as variable load flashers are well known in the art. It can be a combination of shunt type flasher with a magnetic relay such as is described and claimed in my said copending application or it could be a variable load flasher such as is disclosed in Schmidinger Patent 3,037,102, dated May 29, 1962. The input terminal of the flasher, indicated at X, is connected by a lead 32 to the positive terminal of battery 26. A load terminal, indicated by the letter L, is connected by a lead 34 to a segment 36 of the Bell switch and the pilot terminal of the flasher, indicated at P, is connected by a lead 38 to a segment 40 of the Bell switch. The brake switch, indicated at 42, is connected between the positive terminal of the battery 26 and a lower U-shaped segment 44 of the Bell switch. A day-night switch is diagrammatically shown at 46 as comprising three contacts 48, 50 and 52 which at night are connected together by a bar 54 and five contacts 56, 58, 60, 62 and 64 which are connected together by the bar 54 under day-time conditions. A switch for emergency flashing of all lights is shown at 66 as including a bar 68 having two conducting segments 68a and 68b separated by an insulator section 70 and three contacts 72, 74 and 76 adapted to be bridged by segment 68a of the bar 68 and two contacts 78 and 80 adapted to be bridged by the other conducting segment 68b of bar 68 when the switch is closed.

The remaining segments of the Bell switch 30 will now be identified and the operation of the switch briefly explained. There is an upper U-shaped segment 82, similar to segment 44, between the arms of which are two smaller segments 84 and 86. Below the left and right arms of segment 82 are two segments 88 and 90. Below segment 40 and aligned with it and with segments 84 and 86 are two smaller segments 92 and 94 and above the arms of segment 44 are two elongated segments 96 and 98. Two bars each having two separate conducting portions, not shown, interconnect certain of the segments in the neutral and left and right signalling positions. The following table shows the segments that are connected for each position of the operating bars of the switch:

In neutral position

Segments 82 and 88 are connected together as are segments 96 and 44.

Also segment 82 is connected to segment 90 and segment 98 to segment 44.

In left turn position

Segments 84 and 40 are connected together as are segments 92, 36 and 96.

No change is made in the connection between segments 82 and 90 and segments 98 and 44.

In right turn position

Segments 86 and 40 are connected and segments 94, 36 and 98 are connected.

No change is made in the connection of segments 88 and 84 and in the connection of segments 96 and 44 corresponding to the neutral position.

Segment 84 of the Bell switch is connected by lead 100 to one end of both filaments of pilot light 22 and similarly segment 86 is connected by a lead 102 to both filaments of pilot lamp 24. Segment 40, as heretofore indicated, is connected by lead 38 to the P terminal of flasher 28. Segment 88 is connected by a lead 104 to one end of filament 6 of lamp 14 and to contact 56 of the headlight switch 46. Similarly, segment 90 of the Bell switch is connected through a lead 106 to one end of filament 6 of lamp 16 and also to contact 64 of the headlight switch 46. Segment 92 is connected by a lead 108 to one filament 110 of parking and directional signal lamp 18 and similarly segment 94 is connected by a lead 112 to one filament 114 of parking and signalling lamp 20. Segment 36, as heretofore indicated, is connected through lead 34 to the L terminal of the flasher 28. Segment 96 is connected through a lead 116 to one end of each of filaments 4 and 6 of lamp 14 and similarly segment 98 is connected through a lead 118 to one end of both filaments 4 and 6 of lamp 16.

In the headlight switch 46, contact 52 is connected by lead 120 to the positive terminal of the battery. Contact 50 is connected by a lead 122 to the second or minor filament of each of lamps 18 and 20. Contact 48 is connected by a lead 124 to segment 82 of the Bell switch.

The contacts of switch 46 engageable by the bar 54 under day-time conditions are connected as follows: Contact 56 to lead 104 interconnecting filament 6 of lamp 14 and segment 88, contact 58 by a lead 126 to one end of filament 128 of pilot lamp 22, contact 60 to ground, contact 62 by a lead 130 to one end of filament 132 of pilot lamp 24, and contact 64 to lead 106 interconnecting filament 6 of lamp 16 and segment 90 of the Bell switch.

Before describing the connections to the emergency switch 66, the operation of the circuit with reference to signalling and dual intensity will first be described.

Assuming, first, night-time operation with bar 54 of switch 46 interconnecting contacts 48, 50 and 52 and the Bell switch in neutral position. Parking filament 134 of lamp 110 and parking filament 136 of lamp 20 will be energized through lead 122, contacts 50 and 52, wire 120 to the battery 26. Filaments 4 and 6 of each tail lamp 14 and 16 will be energized in series from the battery through bar 54, contacts 52 and 48, lead 124, segment 82 of the Bell switch and segments 88 and 90, respectively, of the Bell switch through the filaments 6 and 4 to ground. As described in connection with the description of the lamp of FIG. 1, the candle power of lamps 14 and 16 under these conditions will be 7 candle power. It will be noted that leads 116 and 118 connected respectively to segments 96 and 98 of the Bell switch will not be connected to the battery if the brake switch 42 is open. If now the brake switch 42 is closed and the Bell switch is still in neutral position, positive potential is impressed through segment 44 and segments 96 and 98 to leads 116 and 118, respectively. Thus the battery voltage is applied at both ends of each filament 6 and therefore no current will flow through such filament. Battery current will however flow through each filament 4 during the application of the brake increasing the lamp brilliance to 14 candle power. If now, without the brake being applied, it is desired to make a left turn, still under night conditions, with the Bell switch moved for left turn signalling, no change in illumination of filaments of lamps 16 and 20 on the right side of the vehicle is made. However, in the left turn position of the Bell switch, lead 34 from the L terminal of the flasher is connected through segments 36 and 96 to lead 116 to impress the voltage of the battery across the filament 4 intermittently at the rate of flashing of flasher 28. The lead 104 from filament 6 of lamp 14 is open at segment 88 so that during the flashing operation the tail light is disconnected from the circuit as is required in present day systems.

Under these conditions, if the brake switch 42 is closed, the battery potential is applied to lead 118 through segments 44 and 98 and applied to the other end of filament 6 of lamp 16 through segments 90 and 82, lead 124 and contacts 48 and 52 of the night switch 46. Accordingly, no current will flow through filament 6 of lamp 16 but the full voltage will be impressed across filament 4 and the lamp will light steady at 14 candle power.

During the flashing of lamp 14, voltage is impressed across filament 138 of pilot lamp 22 through lead 100, segments 84 and 40 and lead 38 to the P terminal of the flasher 28. Filament 128 of pilot lamp 22 is preferably of about 3 candle power and filament 138 of about 7 candle power. Voltage is also impressed during night left turn signalling across filament 110 of the left front lamp 18 through lead 108, segments 92 and 36, lead 34 to the L terminal of the flasher 28. Pilot 24 remains de-energized as segment 86 of the Bell switch is isolated in the left turn position.

During day-time operation, bar 54 is moved into position to interconnect contacts 56, 58, 60, 62 and 64 thereby grounding the leads to these contacts through contact 60. The grounding of these contacts provides a ground connection for filaments 6 of lamps 14 and 16 and for filaments 128 and 132 of pilot lamps 22 and 24. In this position of the switch 46, when a left turn is to be made, the L terminal of the flasher is connected through segments 36 and 96 to lead 116 and through both filaments 4 and 6 of lamp 14 to ground. Accordingly, the lamp 14 will flash and have an intensity of 44 candle power. Similarly, voltage from the P terminal of the flasher 28 will be applied through segments 40 and 84 to lead 100 and through both filaments 128 and 138 to ground, increasing the intensity of the pilot lamp to 10 candle power as compared to 7 candle power operation during night-time conditions.

From the foregoing description, the variations in intensity of the tail and signalling lights during day and night as desired by the automobile manufacturers will be apparent, the tail lights having an intensity of 7 candle power when no signalling is effected at night, an intensity of 14 candle power at night when signalling is being effected with the tail light completely extinguishing between flashes, and an intensity of 44 candle power during day time flashing, and also the circuit provides for brighter pilot lamps during day time operation.

The connection to the emergency switch 66 and the operation of the circuit when that switch is closed will now be described. Contact 72 is connected to one end of filament 110 of the front lamp 18. Contact 74 is connected to segment 44 of the Bell switch. Contact 76 is connected to lead 112 leading to one end of filament 114 of the right front lamp 20. These three contacts, when switch 66 is closed, are connected together by segment 68a and to a lead 140 connected to the L terminal of the flasher. Contact 78 is connected to lead 100 which is connected to both filaments of pilot lamp 22 and contact 80 is connected to lead 102 which is connected to both filaments of pilot lamp 24. When switch 66 is closed, these contacts 78 and 80 are connected together by segment 68b and to a lead 142 connected to the P terminal of the flasher. Thus, when switch 66 is closed, the L terminal of the flasher is connected directly to filaments 110 and 114 of the lamps 18 and 20 independently of the Bell switch and through segment 44 and segments 96 and 98 of the Bell switch to both filaments of the rear lamps 14 and 16. Also the P terminal of the flasher is connected directly to the filaments of both pilot lamps. Under night-time conditions and with the Bell switch in neutral position, lead 104 is connected through segments 88 and 82 and switch 46 to the battery and hence only filament 4 of tail lamp 14 will be energized to an intensity of 14 candle power. Similarly, only filament 4 of tail lamp 16 will be flashed as positive potential is applied to both ends of the filament 6 of that tail lamp. Under day conditions, filament 6 of each tail lamp 14 and 16 and filaments 128 and 132 of pilot lamps 22 and 24 are grounded and hence the throwing of the emergency switch 66 will energize the two filaments 4 and 6 of each rear lamp 14 and 16 to give the full 44 candle power and will energize both filaments of both pilot lamps. It is not necessary that the Bell switch be in neutral position when the emergency switch is closed. When the emergency switch is closed, the P and L terminals of the flasher are connected to the front signal and pilot lamps independently of the Bell switch. In the neutral position of the switch, leads 116 and 118 to the filaments of the rear lamps 14 and 16 are connected through segments 96 or 98 and 44 of the Bell switch and contact 74 of the emergency switch to the L terminal of the flasher whereas in the left turn position of the Bell switch, lead 116 is connected through segments 96 and 36 directly to the L terminal of the flasher and in the right turn position of the Bell switch, lead 118 connected to the filaments of lamp 16 is connected through segments 98 and 36 to the L terminal of the flasher.

If it is desired to utilize the new lamp of the invention in circuits already in use on automobiles to obtain dual intensity of the tail lamps, this can be effected, as shown in FIG. 3, by the simple addition of a relay connected to the leads to the minor filaments of the tail lamps without any other change in the circuit. Thus, the invention lends itself to modification of systems already installed without requiring an entirely new signal circuit.

FIG. 3 a standard signalling system in use for some years on automobiles is diagrammatically shown with the addition thereto of a relay indicated by the reference numeral 144 and by the replacement of the rear signalling and tail lamps of the circuit by the lamps 14a and 16a. The conventional system as diagrammatically indicated in FIG. 3 includes a two terminal series type flasher 146 of standard construction having a terminal 148 connected to the positive terminal of the battery, indicated in FIG. 3 by the symbol + and an output terminal connected to the Bell switch represented by the rectangle 150. The signal filament of each front lamp 152 and 154 is connected to the Bell switch for energization during signalling and the left and right pilot lamps 158 and 160 are connected in parallel with the lamps 152 and 154, respectively. The brake switch 162 is connected between the battery and the Bell switch as in the circuit of FIG. 2. In the lamp 14a, filament 6 is grounded at one end and connected to a lead 164 connected to the Bell switch and to one end of filament 4, the other end of which is connected to filament 4 of lamp 16a through a lead 166. Lead 166 is connected to the headlight switch 168 which is closed at night to insert the filaments 4 and 6 of each lamp 14a and 16a in series with the battery. Lead 166 is also connected to the relay 144. Relay 144 comprises a vane 170 which is constrained against the bias therein by a pull ribbon 172 when the pull ribbon is cold and which carries a contact normally engaging a fixed contact 173 connected to lead 166. The vane 170 is grounded and a heater 174 which encircles the pull ribbon 172 is connected at one end to lead 166 and is grounded at its other end.

During day-time operation, when switch 168 is open, if a turn is to be initiated and the Bell switch therefore moved in a position to connect the output of flasher 146 to lead 164, current will flow through filament 6 to ground and through filament 4 and the pull ribbon 172 of the relay to ground. This current, because of the inclusion of the resistance of filament 4 in its circuit, will be small and therefore the pull ribbon 172 will not expand sufficiently to permit the vane 170 to snap to the contact open position. Accordingly, both filaments 4 and 6 of the lamp 14a, assuming the Bell switch for left turn position, or both filaments 4 and 6 of lamp 16a in the case of a right turn position of the Bell switch, will flash, yielding an output of 44 candle power if the filaments are of the same magnitude as those described in connection with FIGS. 1 and 2.

During night-time operation, however, with switch 168 closed, the full battery is placed across the pull ribbon of the relay and consequently the ribbon will expand rapidly and the vane will snap immediately to contact open position placing the heater 174 in circuit between the battery and ground. The heat generated in the heater 174 will be sufficient to maintain the relay in the open contact position and accordingly current will flow from the battery through switch 168 and filaments 4 and 6 of each tail lamp in series to provide the low intensity tail light desired which, in the case of the specific values of filaments heretofore described, would be 7 candle power. When the left rear signal lamp is to be flashed, battery voltage is impressed on line 164 across filament 6 of lamp 14a to flash that filament and filament 4 will be out of the circuit because the battery will be impressed on both ends thereof. During the "off" cycle of the flasher, however, the filaments 4 and 6 will be connected in series between the battery and ground so that, unlike the circuit of FIG. 2, the tail light will not be entirely extinguished during signalling. It will be apparent from the foregoing description that the simple addition of the relay 144 and the replacement of the tail lamps of a conventional circuit by the new lamps converts the circuit into a practical dual intensity circuit so far as the rear lamps of the circuit are concerned.

For the particular application of FIG. 3, somewhat different values of the filaments 4 and 6 than those given in connection with the system of FIG. 2 have been found desirable. For example, when the new lamp is to be used in an existing circuit as in FIG. 3, filament 6 may be a 28 candle power filament and filament 4 a 20 candle power filament. With these values during day-light flashing, the lamp operates at 48 candle power whereas during night-time the steady tail lamp with the two filaments in series yields 6 candle power and at night during flashing the intensity is 28 candle power.

From the foregoing description, it will be apparent that the new lamp construction together with the specific circuits heretofore described provides means for readily converting existing automobile signalling circuits into dual intensity circuits and also provides a complete dual intensity and emergency signalling system. The new lamp construction with its two filaments, one grounded at the shell and the other brought out to a terminal for connection either to ground or to a suitable source of energy, has utility in circuits other than those specifically described as it lends itself to use as a lamp of three different intensities depending upon the connections to the terminals of the lamp. Obviously, in the described new circuits, the invention is not limited to the use of all of the specific elements described as parts could be omitted without impairing the usefulness of those retained. The invention in its broadest aspects is limited only by the scope of the accompanying claim.

I claim:

In a dual intensity signalling system for automotive vehicles having a battery; a shunt-type flasher connected to said battery; and a directional multi-element switch having neutral, left, and right positions; the improvement comprising left and right rear signalling lamps each having major and minor filaments of different candle power, one end of each of said filaments being connected to the directional switch for connection to the flasher during signalling, the other end of each minor filament being grounded; a day-night two position switch which in day position connects the other end of each major filament to ground and in night position connects said other end of each major filament to the battery through the directional switch when in neutral position for energizing the filaments of each lamp in series as tail lights; left and right pilot lamps each having major and minor filaments of different candle power, one end of each of said pilot lamp filaments being connected to said directional switch for connection to said flasher during signalling, the other end of each pilot lamp minor filament being grounded and the other end of each pilot lamp major filament being connected to said day-night switch for grounding in the day position thereof; left and right front signalling lamps; and an emergency two position switch which in emergency position connects said front signalling lamps and the filaments of both pilot lamps and of both rear signalling lamps to the flasher to flash all lamps simultaneously irrespective of the position of said directional switch.

References Cited

UNITED STATES PATENTS

| | | | |
|---|---|---|---|
| 2,227,324 | 12/1940 | Severin | 313—271 |
| 2,396,674 | 3/1946 | Braunddorff et al. | 313—271 |
| 3,206,723 | 9/1965 | Doane | 340—81 |
| 3,213,418 | 10/1965 | Skinner et al. | 315—77 |
| 3,244,934 | 4/1966 | Webb | 315—77 |

JAMES W. LAWRENCE, *Primary Examiner.*

R. JUDD, *Assistant Examiner.*